United States Patent
Sengodan et al.

(10) Patent No.: US 12,352,355 B2
(45) Date of Patent: Jul. 8, 2025

(54) SYSTEM AND METHOD FOR MONITORING GASKET SEALING HEALTH

(71) Applicant: GOODRICH CORPORATION, Charlotte, NC (US)

(72) Inventors: Rajkumar Sengodan, Bangalore (IN); Thirunavukkarasu Ramalingam, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 79 days.

(21) Appl. No.: 18/101,365

(22) Filed: Jan. 25, 2023

(65) Prior Publication Data
US 2024/0159314 A1 May 16, 2024

(30) Foreign Application Priority Data
Nov. 15, 2022 (IN) .............................. 202241065397

(51) Int. Cl.
F16J 15/06 (2006.01)
G01M 3/40 (2006.01)

(52) U.S. Cl.
CPC .............. F16J 15/064 (2013.01); G01M 3/40 (2013.01)

(58) Field of Classification Search
CPC ....... G01M 3/40; F16J 15/064; F16J 15/3492; F16J 15/3296
See application file for complete search history.

(56) References Cited

U.S. PATENT DOCUMENTS

| | | | | |
|---|---|---|---|---|
| 5,540,448 A | * | 7/1996 | Heinzen | F16J 15/3296 277/944 |
| 5,785,323 A | * | 7/1998 | Heinzen | F16J 15/16 277/582 |
| 7,180,227 B2 | * | 2/2007 | Tseng | F16J 15/32 310/369 |
| 7,280,219 B1 | * | 10/2007 | Discenzo | B60C 23/0408 356/477 |
| 7,398,692 B2 | * | 7/2008 | Hiroki | F16J 15/104 73/706 |
| 9,291,590 B2 | * | 3/2016 | Mosley | G01N 27/404 |
| 2007/0241510 A1 | * | 10/2007 | DiLeo | B01D 35/14 73/865.9 |
| 2009/0317028 A1 | * | 12/2009 | Castleman | F16J 15/3296 340/682 |
| 2010/0127460 A1 | * | 5/2010 | Bennett | F16J 15/064 277/592 |
| 2012/0049871 A1 | * | 3/2012 | Raj | F16J 15/43 277/410 |

(Continued)

FOREIGN PATENT DOCUMENTS

| | | | |
|---|---|---|---|
| JP | 02176270 | * | 1/2013 |
| JP | 2021060216 A | * | 4/2021 |
| WO | 2021099044 | | 5/2021 |

*Primary Examiner* — Eugene G Byrd
(74) *Attorney, Agent, or Firm* — SNELL & WILMER L.L.P.

(57) ABSTRACT

A method is provided for monitoring a health of gasket sealing between components. The method includes determining, by a controller, an effective resistance value for a gasket between two components. The method further includes, responsive to the effective resistance value being greater than a first resistive value range of and a second resistive value range, transmitting, by the controller, an indication that the gasket needs to be replaced.

18 Claims, 6 Drawing Sheets

(56) References Cited

U.S. PATENT DOCUMENTS

| | | | |
|---|---|---|---|
| 2012/0261944 A1* | 10/2012 | Kreil | F16J 15/3296 277/628 |
| 2012/0312560 A1* | 12/2012 | Bahr | E21B 33/1208 166/387 |
| 2015/0145533 A1* | 5/2015 | Baileys | G01R 27/2605 324/663 |
| 2018/0274682 A1* | 9/2018 | Shimizu | F16J 15/3296 |
| 2018/0299013 A1* | 10/2018 | Franz | F16J 15/164 |
| 2019/0078972 A1* | 3/2019 | Sitko | G01M 13/005 |
| 2020/0309673 A1* | 10/2020 | Elder | G01N 17/00 |
| 2020/0370655 A1* | 11/2020 | Nahrwold | F16J 15/3284 |
| 2021/0071715 A1* | 3/2021 | Tsai | F16H 25/2006 |
| 2021/0108723 A1* | 4/2021 | Jongsma | E21D 11/385 |
| 2022/0403935 A1* | 12/2022 | Lauer | F16J 15/3296 |

\* cited by examiner

SYSTEM AND METHOD FOR MONITORING GASKET SEALING HEALTH

CROSS-REFERENCE TO RELATED APPLICATIONS

This application claims priority to, and the benefit of, India Patent Application No. 202241065397 (DAS CODE: F4B1), filed Nov. 15, 2022, and titled "MONITORING GASKET SEALING HEALTH," which is incorporated by reference herein in its entirety for all purposes.

FIELD

The present disclosure relates to systems and methods for sealing between components, and more specifically, to monitoring the health of a gasket sealing between components.

BACKGROUND

In vehicles, there are many line-replaceable units (LRUs) that are subjected to adverse environmental conditions. LRUs are designed modular components that may be replaced quickly in response to a fault occurring. Due to the conditions LRUs are subjected to, many LRUs are identified with issues such as, water ingress or lubricant leaks, among others, that impact the function of the LRUs.

SUMMARY

Disclosed herein is a method monitoring a health of gasket sealing between components. The method includes determining, by a controller, an effective resistance value for a gasket between two components. The method further includes transmitting, by the controller, an indication that the gasket needs to be replaced in response to the effective resistance value being greater than a first resistive value range of and a second resistive value range.

In various embodiments, the method further includes transmitting, by the controller, an indication that the gasket is misaligned between the two components in response to the effective resistance value being within the second resistive value range. In various embodiments, the method further includes transmitting, by the controller, an indication that the gasket is in good condition in response to the effective resistance value being within the first resistive value range.

In various embodiments, the controller is configured to identify that the second resistive value range is greater than the first resistive value range. In various embodiments, the controller is configured to monitor a conductive metal wire disposed within a center of an elastomeric material that forms the gasket. In various embodiments, the elastomeric material is an electrical insulator.

In various embodiments, a cross section of the elastomeric material is at least one of a circular shape, a square shape, or a rectangular shape. In various embodiments, the conductive metal wire has a wire resistance of 0.25 Ohms to 3 Ohms. In various embodiments, the controller is configured to monitor a resistance of the gasket that is fitted into a recess within at least one of the two components. In various embodiments, the gasket is compressed when the two components are fitted to each other thereby providing a seal to prevent an ingress of contaminants or an egress of fluids.

Also disclosed herein is a system for monitoring a health of gasket sealing between components. The system includes a gasket; a first component; a second component; and an electronic controller, wherein the electronic controller is configured to: determine an effective resistance value for the gasket between the first component and the second component; and transmit an indication that the gasket needs to be replaced in response to the effective resistance value being greater than a first resistive value range of and a second resistive value range.

In various embodiments, the electronic controller is further configured to transmit an indication that the gasket is misaligned between the first component and the second component in response to the effective resistance value being within the second resistive value range. In various embodiments, the electronic controller is further configured to transmit an indication that the gasket is in good condition in response to the effective resistance value being within the first resistive value range.

In various embodiments, the electronic controller is configured to identify that the second resistive value range is greater than the first resistive value range. In various embodiments, the electronic controller is configured to monitor a conductive metal wire disposed within a center of an elastomeric material that forms the gasket. In various embodiments, the elastomeric material is an electrical insulator.

In various embodiments, a cross section of the elastomeric material is at least one of a circular shape, a square shape, or a rectangular shape. In various embodiments, the conductive metal wire has a wire resistance of 0.25 Ohms to 3 Ohms. In various embodiments, the electronic controller is configured to monitor a resistance of the gasket that is fitted into a recess within at least one of the two components. In various embodiments, the gasket is compressed when the first component and the second component are fitted to each other thereby providing a seal to prevent an ingress of contaminants or an egress of fluids.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an," or "the" may include one or more than one and that reference to an item in the singular may also include the item in the plural. Further, all ranges may include upper and lower values and all ranges and ratio limits disclosed herein may be combined.

Disclosed herein is a system and methods for monitoring the health of a gasket sealing between components within a line-replaceable unit (LRU). An LRU is a modular component that may be replaced quickly when a fault occurs. Due to conditions that a LRU is subjected to, an LRU may experience issues such as, in various embodiments, water ingress or lubricant leaks, among others, that impact the function of the LRU. Most LRUs fail due to water ingress because of gasket misalignment within groove between components of the LRU or deterioration of the gasket over period of time. Other LRUs fail due to improper assembly of seal, which may cause a lubricant egress. Ingress or egress leaks may be detected only after assembly of the LRU is complete and the lubricant is inserted in the housing, which may cause a full dismantling of the LRU to fix the issue, which may be time consuming. Accordingly, in various embodiments, monitoring of gasket sealing within a LRU to detect issues such as water ingress or lubricant leaks, among others, provides improved smart and intelligent ingress and egress protection thereby providing for more efficient and effective systems with high reliability.

Figure 1:
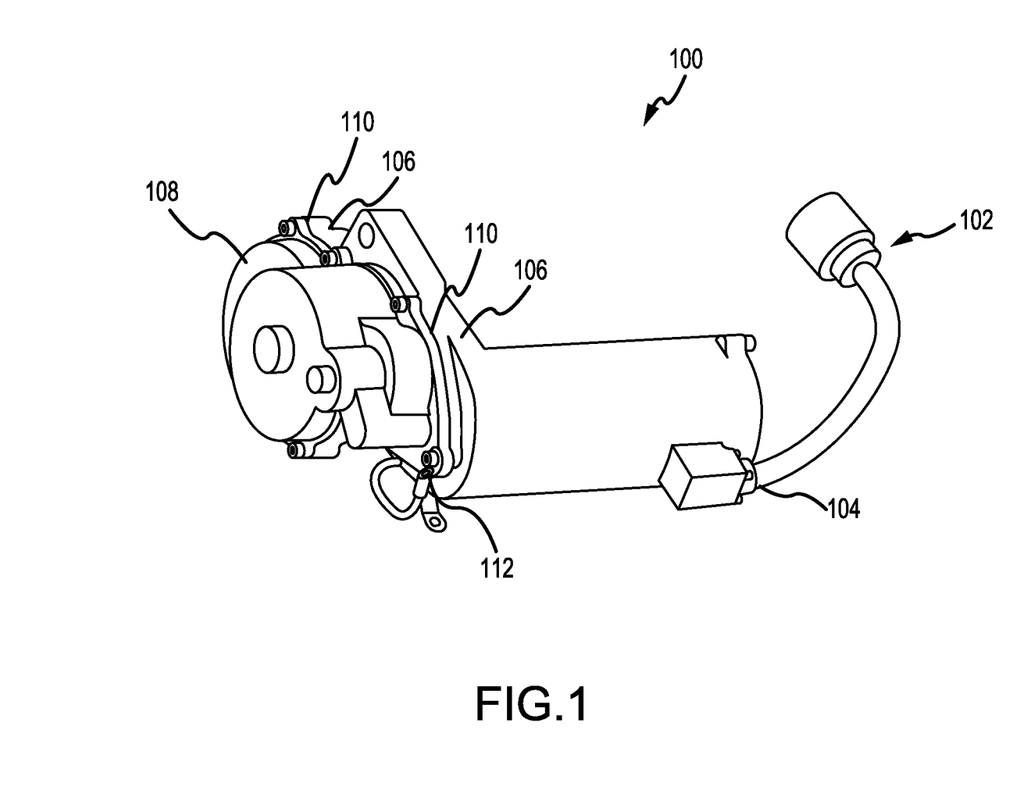
FIG. 1 illustrates a line-replaceable unit (LRU), in accordance with various embodiments.

Referring now to FIG. 1, in accordance with various embodiments, a line-replaceable unit (LRU) 100 is illustrated. In various embodiments, the LRU 100 is one of a number of LRUs that may be present within a vehicle, such as an aircraft, automobile, or water vessel, among others. In various embodiments, the LRU 100 may include a housing wiring harness 102 to couple to another component of the vehicle and provide an electrical pathway for electrical signals between the LRU 100 and the other component, a shell wiring harness 104 to couple to the LRU 100 and provide an electrical pathway for electrical signals between the other component and the LRU 100, a housing 106 for the components of the LRU 100, a cover 108 that couples to the housing 106, and interface 110 between the cover 108 and the housing 106 in which lies a gasket that prevents ingress of contaminants and/or egress of fluids, and grounding cable 112.

Figure 2A:
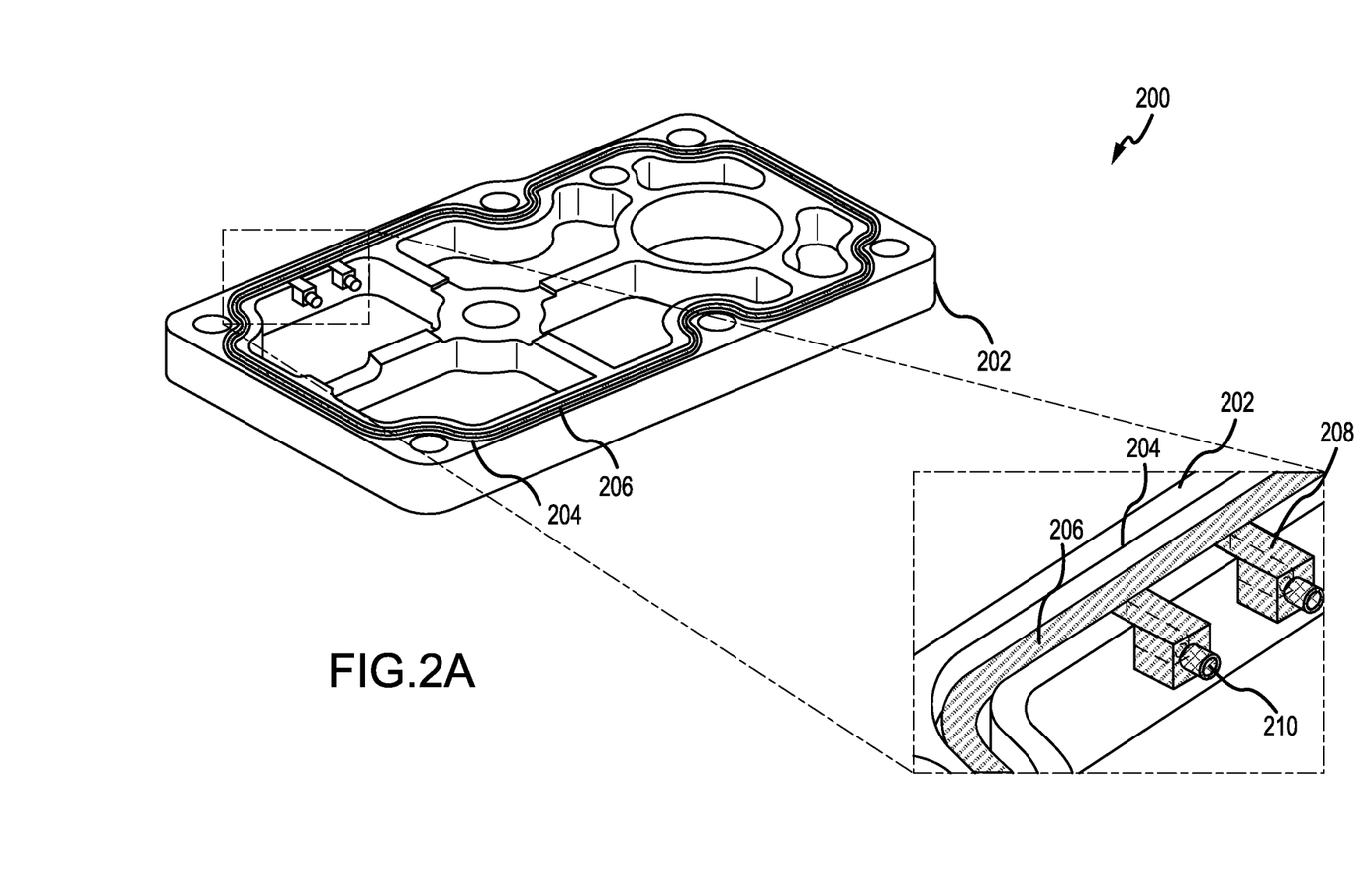
FIG. 2A illustrates an isometric view of a portion of a line-replaceable unit (LRU) housing, in accordance with various embodiments.
Figure 2B:
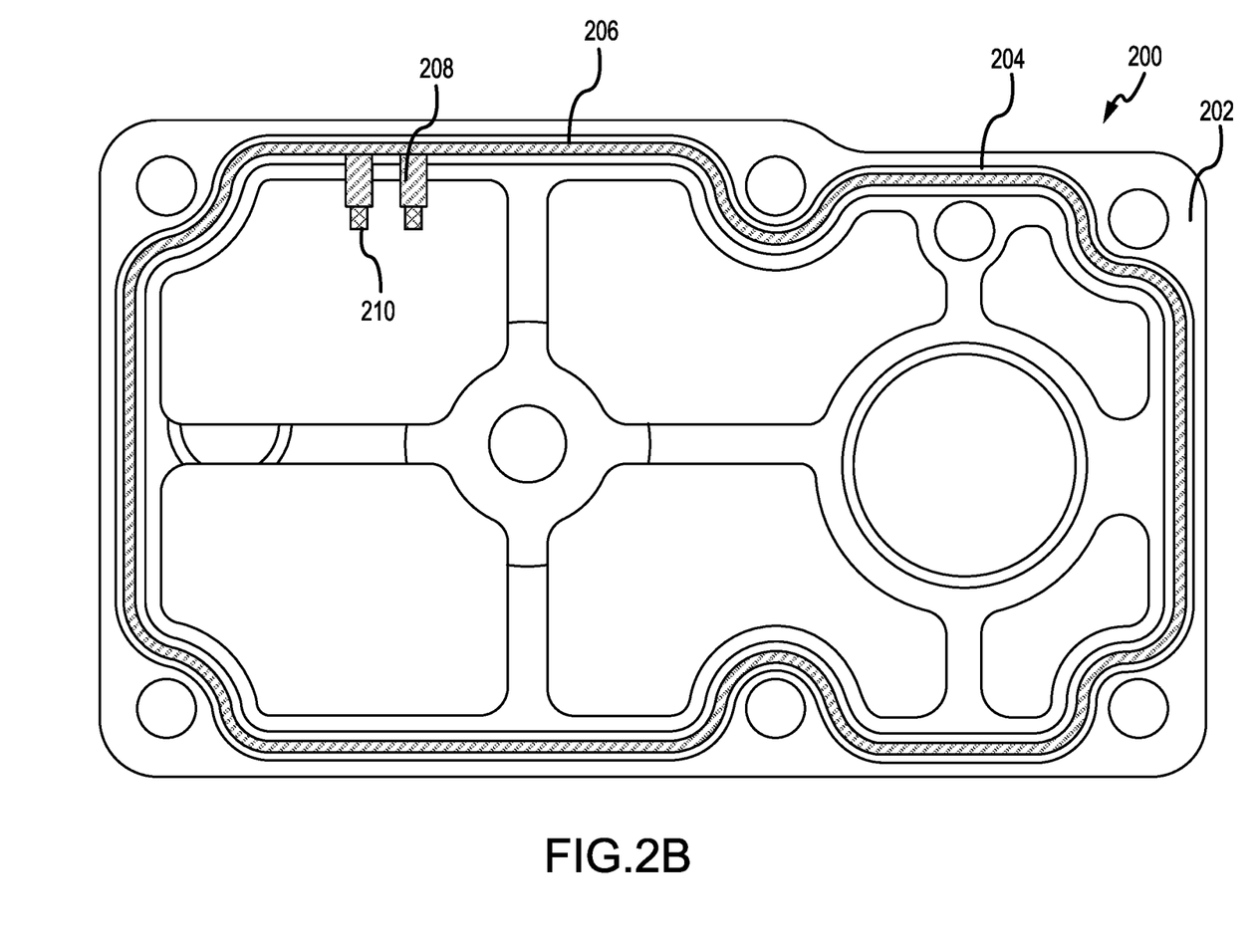
FIG. 2B illustrates a top view of a portion of a line-replaceable unit (LRU) housing, in accordance with various embodiments.

Turning to FIGS. 2A and 2B, in accordance with various embodiments, an isometric view and a top view, respectively, of a portion of a line-replaceable unit (LRU) housing 200, such as housing 106 of FIG. 1, is illustrated. In various embodiments, the LRU housing 200 includes a chassis 202, a recess 204, and a gasket 206. In various embodiments, recess 204 is a channel or groove formed substantially around a perimeter of a face of the chassis 202 that will couple to a cover or other component. In various embodiments, the gasket 206 includes an elastomeric material 208 formed around a conductive metal wire 210 metal wire. In various embodiments, the elastomeric material 208 may be an electrical insulator. In various embodiments, the conductive metal wire 210 is conductive having a typical wire resistance. In various embodiments, the typical wire resistance may be from 0.001 Ohms to 3 Ohms. In various embodiments, the typical wire resistance may be from 0.5 Ohms to 2 Ohms. In various embodiments, the typical wire resistance may be 1 Ohm. In various embodiments, the wire resistance may be of any value irrespective of mentioned values. Accordingly, in various embodiments, the typical wire resistance may be of any value based on length of the conductive metal wire 210. In various embodiments, a cross section of the elastomeric material 208 may be a circular shape, a square shape, or a rectangular shape, among others. In various embodiments, the conductive metal wire 210 couples to an electronic controller of the LRU that monitors a health of the gasket 206 based on a resistance measurement.

Figures 3A, 3B:
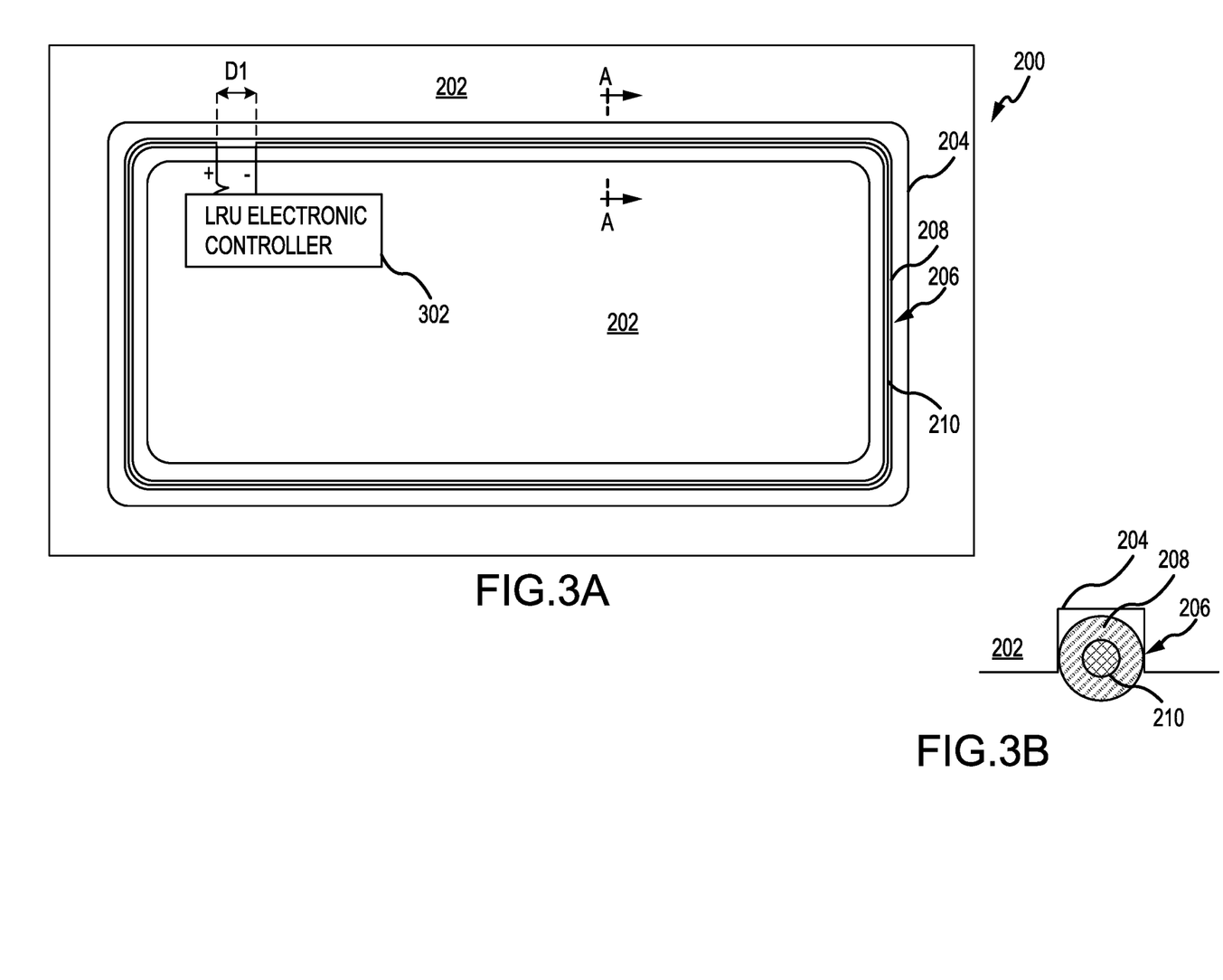
FIG. 3A illustrates a gasket within a recess of a chassis of a line-replaceable unit (LRU) housing, in accordance with various embodiments.
FIG. 3B illustrates a cross-sectional view of a gasket taken along section line A-A of the gasket of FIG. 3A, in accordance with various embodiments.

Turning to FIG. 3A, in accordance with various embodiments, a gasket 206 within a recess 204 of a chassis 202 of a line-replaceable unit (LRU) housing 200 is illustrated. In various embodiments, the conductive metal wire 210 is formed within the elastomeric material 208 of the gasket 206. In various embodiments, while the elastomeric material 208 navigates the entirety of the length of the recess 204, the conductive metal wire 210 navigates substantially the entirety of the length of the recess 204 minus a dimension D1 where the ends of the conductive metal wire 210 exit the gasket 206 in order to connect to an electronic controller 302. In various embodiments, the dimension D1 may be 0.01 inches (0.0254 centimeter) to 0.05 inches (0.127 centimeter). In various embodiments, the dimension D1 may be 0.02 inches (0.0508 centimeter) to 0.04 inches (0.1016 centimeter). In various embodiments, the dimension D1 may be 0.03 inches (0.0762 centimeter). In various embodiments, the area between the ends of the conductive metal wire 210 where the ends of the conductive metal wire 210 exit the gasket 206 may be filled with the elastomeric material 208.

Turning to FIG. 3B, in accordance with various embodiments, a cross-sectional view of a gasket 206 taken along section line A-A of the gasket 206 of FIG. 3A is illustrated. In various embodiments, the gasket 206 is disposed within the recess 204 of the chassis 202. In various embodiments, the gasket 206 its substantially but not entirely within the recess 204 so that, when a mating component is fitted to chassis 202, a seal between the chassis 202 and the mating component is provided by the gasket 206. As illustrated, the conductive metal wire 210 disposed substantially within a center of the elastomeric material 208 of the gasket 206.

Figure 4:
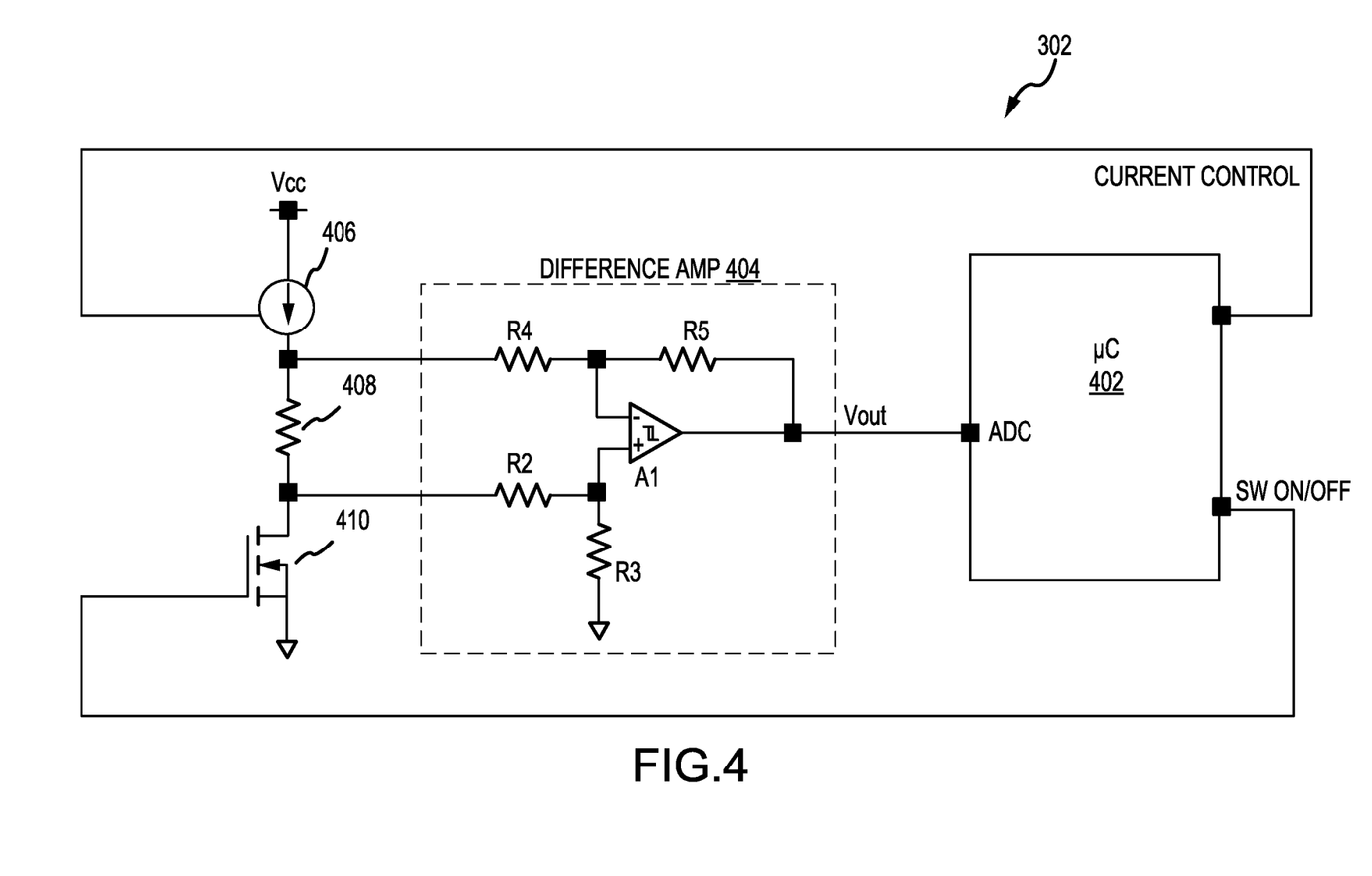
FIG. 4 illustrates a circuit configuration of an electronic controller that couples to a gasket, in accordance with various embodiments.

Turning to FIG. 4, in accordance with various embodiments, a circuit configuration of the electronic controller 302 that couples to the gasket 206 is illustrated. The electronic controller 302 may include a logic device such as one or more of a central processing unit (CPU), an accelerated processing unit (APU), a digital signal processor (DSP), a field programmable gate array (FPGA), an application specific integrated circuit (ASIC), or the like. In various embodiments, the electronic controller 302 may further include any non-transitory memory known in the art. The memory may store instructions usable by the logic device to perform operations as described herein.

Therefore, in various embodiments, the electronic controller 302 includes a microcontroller (μC) 402, a differential amplifier 404, a controlled current source 406, a resistor 408 that represents the resistance of the conductive metal wire of the gasket, such as the conductive metal wire 210 of the gasket 206 of FIGS. 2A, 2B, 3A, and 3B, and solid-state switch 410. In various embodiments, the controlled current source 406, which operates based on voltage Vcc, provides a current flow to the resistor 408 that represents the resistance of the conductive metal wire of the gasket and to the differential amplifier 404. In various embodiments, the controlled current source 406 may be regulated by the microcontroller (μC) 402. In various embodiments, if a constant current source is used, then the controlled current source 406 requires no regulation from the microcontroller (μC) 402.

In various embodiments, the differential amplifier 404, which is an operational amplifier configured as a differential amplifier, produces a voltage proportional to an unknown resistance. In various embodiments, the differential amplifier 404 operates as a four-wire measuring circuit. In various embodiments, the differential amplifier 404 may be configured at unity gain, which simplifies selection of the resistance values of R2, R3, R4, and R5. Thus, in various embodiments, the differential amplifier 404 amplifies the difference between the voltage output by the controlled current source 406 and the voltage output by the controlled current source 406 after passing through the resistor 408 that represents the resistance of the conductive metal wire of the gasket. In various embodiments, the difference of the two voltages is then amplified and output to the microcontroller (μC) 402.

An analog-to-digital converter (ADC) within the microcontroller (μC) 402 provides a scale measurement or a digital value. In various embodiments, a full-range scale of the ADC may be from 0 Ohms to 100 Ohms and thus, may produce a digital resistance value from 0 to 1000. In various embodiments, the microcontroller (μC) 402 may use the digital resistance value provided by the ADC to determine one or more events, such as a gasket misalignment within a recess of a chassis, such as recess 204 of FIGS. 2A, 2B, 3A, and 3B, or a cut or opening of the gasket due to mechanical stress. In various embodiments, the event may be detected by monitoring the digital resistance value of the gasket and identifying an effective resistance value by comparing the digital resistance value to a stable gasket resistance value such that the effective resistance value is equal to the stable gasket resistance value minus the digital resistance value. In various embodiments, the stable gasket resistance value is obtained during manufacturing.

In various embodiments, the microcontroller (μC) 402 may use a variety of resistive value ranges to determine whether the gasket is in an operational or serviceable condition, to determine whether the gasket is experiencing a misalignment event, or to determine whether the gasket is experiencing a cut or opening event. In various embodiments, a first resistive value range to determine whether the gasket is in an operational or serviceable condition may be when the effective resistance value is between 0 to 5 Ohms. In various embodiments, the first resistive value range to determine whether the gasket is in an operational or serviceable condition may be when the effective resistance value is between 0 to 4 Ohms. In various embodiments, the first resistive value range to determine whether the gasket is in an operational or serviceable condition may be when the effective resistance value is between 0 to 3 Ohms.

In various embodiments, a second resistive value range to determine whether the gasket is experiencing a misalignment event may be when the effective resistance value is between 5.1 to 102 Ohms. In various embodiments, the second resistive value range to determine whether the gasket is experiencing a misalignment event may be when the effective resistance value is between 4.1 to 101 Ohms. In various embodiments, the second resistive value range to determine whether the gasket is experiencing a misalignment event may be when the effective resistance value is between 3.1 to 100 Ohms. In various embodiments, a third resistive value range to determine whether the gasket is experiencing a cut or opening event may be when the effective resistance value is greater than 102 Ohms. In various embodiments, the third resistive value range to determine whether the gasket is experiencing a cut or opening event may be when the effective resistance value is greater than 101 Ohms. In various embodiments, the third resistive value range to determine whether the gasket is experiencing a cut or opening event may be when the effective resistance value is greater than 100 Ohms.

Based on an identification of any of these events, the electronic controller 302 may be configured to provide an indication of the event to a user. In various embodiments, the solid-state switch 410, which may be a N-type metal-oxide-semiconductor (NMOS) transistor, provides switching to the circuit configuration controlled by the microcontroller (μC) 402.

Figure 5:
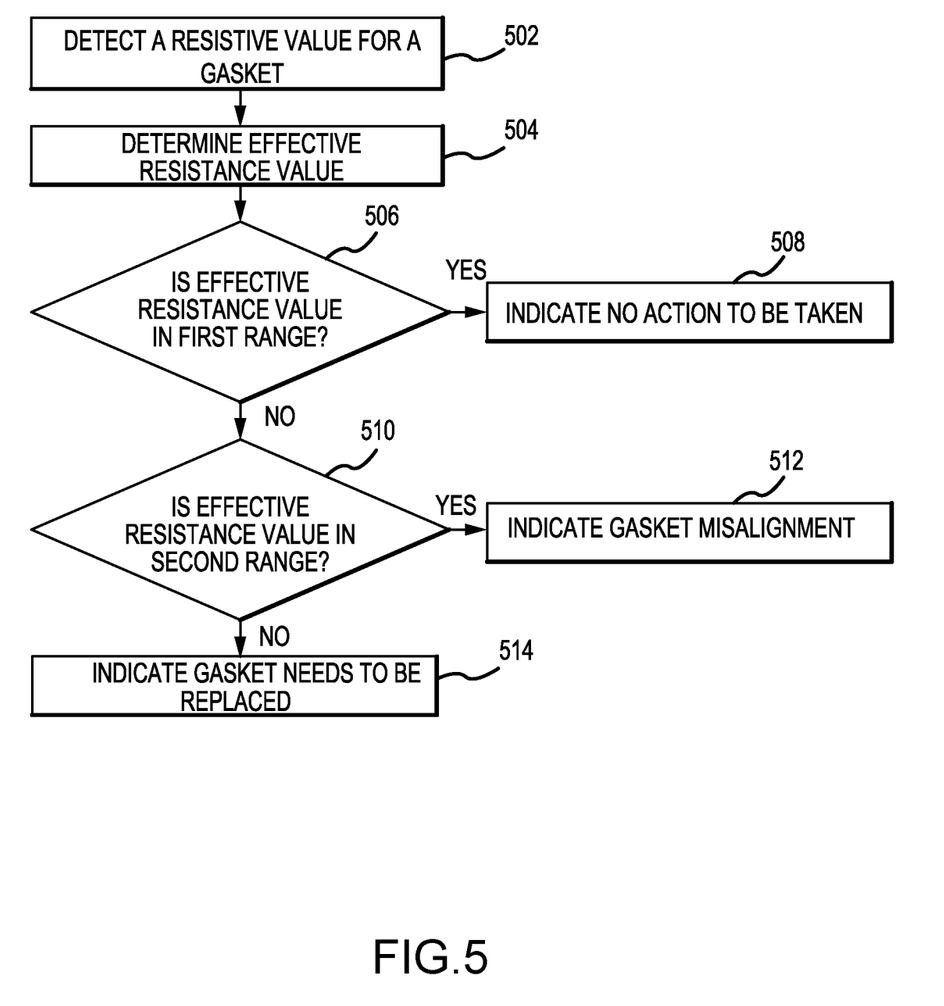
FIG. 5 is a flowchart illustrating a method for monitoring the health of a gasket sealing between components, in accordance with various embodiments.

Referring now to FIG. 5, in accordance with various embodiments, a method 500 for monitoring the health of a gasket sealing between components is illustrated. The method 500 may be performed by an electronic controller 302 described above with respect to FIGS. 3A and 4. At block 502, the electronic controller 302 detects a resistive value of a gasket between two components. At block 504, the electronic controller 302 determines an effective resistance value based on a digital resistance value associated with the gasket resistive value and a stable gasket resistance value. At block 506, the electronic controller 302 determines whether the effective resistance value is within a first resistive value range. If at block 506 the electronic controller 302 determines that the effective resistance value is within the first resistive value range, then, at block 508, the electronic controller 302 provides an indication that no action is to be taken with regard to the gasket. If at block 506 the electronic controller 302 determines that the effective resistance value is not within the first resistive value range, then, at block 510, the electronic controller 302 determines whether the effective resistance value is within a second resistive value range. If at block 510 the electronic controller 302 determines that the effective resistance value is within the second resistive value range, then, at block 512, the electronic controller 302 provides an indication of gasket misalignment. If at block 510 the electronic controller 302 determines that the effective resistance value is not within the second resistive value range and thus, within a third resistive value range, then, at block 514, the electronic controller 302 provides an indication that the gasket needs to be replaced.

Thus, various embodiments may serve as a built-in test capability for gasket and moisture elimination during operating conditions. By adding the conductive metal wire to the gasket, a tensile strength of the gasket is improved which may reduce deformation of the gasket. Further, the provided gasket design and monitoring may reduce the number of egress and ingress issues related field failures in any electromechanical line-replaceable unit (LRU). Thus, the provided gasket and monitoring system may increase the electromechanical product reliability with minimal change to the existing gaskets in all electromechanical LRU.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about," or "approximately" as used herein represent an amount close to the stated amount that still performs a desired function or achieves a desired result. For example, the term "substantially," "about," or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A method for monitoring a health of gasket sealing between components, the method comprising:
    determining, by a controller, an effective resistance value for a gasket between two components, wherein the controller is configured to monitor a conductive metal wire disposed within a center of an elastomeric material that forms the gasket, wherein the elastomeric material navigates an entirety of a length of the gasket, wherein the conductive metal wire navigates substantially the entirety of the length of the gasket minus a dimension where respective ends of the conductive metal wire exit the gasket and couple to the controller, wherein the controller is configured to determine the effective resistance value by comparing a digital resistance value of the gasket to stable resistance value, and wherein the digital resistance value is based on at least a resistance of the conductive metal wire; and
    responsive to the effective resistance value being greater than a first resistive value range of and a second resistive value range, transmitting, by the controller, an indication that the gasket needs to be replaced.

2. The method of claim 1, further comprising:
    responsive to the effective resistance value being within the second resistive value range, transmitting, by the controller, an indication that the gasket is misaligned between the two components.

3. The method of claim 2, further comprising:
    responsive to the effective resistance value being within the first resistive value range, transmitting, by the controller, an indication that the gasket is in good condition.

4. The method of claim 3, wherein the controller is configured to identify that the second resistive value range is greater than the first resistive value range.

5. The method of claim 1, wherein the elastomeric material is an electrical insulator.

6. The method of claim 1, wherein a cross section of the elastomeric material is at least one of a circular shape, a square shape, or a rectangular shape.

7. The method of claim 1, wherein the conductive metal wire has a wire resistance of 0.25 Ohms to 3 Ohms.

8. The method of claim 1, wherein the controller is configured to monitor a resistance of the gasket that is fitted into a recess within at least one of the two components.

9. The method of claim 1, wherein the gasket is compressed when the two components are fitted to each other thereby providing a seal to prevent an ingress of contaminants or an egress of fluids.

10. A system for monitoring a health of gasket sealing between components, the system comprising:
   a gasket;
   a first component;
   a second component; and
   an electronic controller, wherein the electronic controller is configured to:
      determine an effective resistance value for the gasket between the first component and the second component, wherein the electronic controller is configured to monitor a conductive metal wire disposed within a center of an elastomeric material that forms the gasket, wherein the elastomeric material navigates an entirety of a length of the gasket, wherein the conductive metal wire navigates substantially the entirety of the length of the gasket minus a dimension where respective ends of the conductive metal wire exit the gasket and couple to the controller, wherein the controller is configured to determine the effective resistance value by comparing a digital resistance value of the gasket to stable resistance value, and wherein the digital resistance value is based on at least a resistance of the conductive metal wire; and
      responsive to the effective resistance value being greater than a first resistive value range of and a second resistive value range, transmit an indication that the gasket needs to be replaced.

11. The system of claim 10, wherein the electronic controller is further configured to:
   responsive to the effective resistance value being within the second resistive value range, transmit an indication that the gasket is misaligned between the first component and the second component.

12. The system of claim 11, wherein the electronic controller is further configured to:
   responsive to the effective resistance value being within the first resistive value range, transmit an indication that the gasket is in good condition.

13. The system of claim 12, wherein the electronic controller is configured to identify that the second resistive value range is greater than the first resistive value range.

14. The system of claim 10, wherein the elastomeric material is an electrical insulator.

15. The system of claim 10, wherein a cross section of the elastomeric material is at least one of a circular shape, a square shape, or a rectangular shape.

16. The system of claim 10, wherein the conductive metal wire has a wire resistance of 0.25 Ohms to 3 Ohms.

17. The system of claim 10, wherein the electronic controller is configured to monitor a resistance of the gasket that is fitted into a recess within at least one of the two components.

18. The system of claim 10, wherein the gasket is compressed when the first component and the second component are fitted to each other thereby providing a seal to prevent an ingress of contaminants or an egress of fluids.

* * * * *